(12) United States Patent
Sawyer et al.

(10) Patent No.: US 10,173,497 B2
(45) Date of Patent: Jan. 8, 2019

(54) AUXILIARY VEHICLE HVAC SYSTEM FOR EFFICIENT MULTI-ZONE SPOT COOLING

(71) Applicant: Ford Global Technologies, LLC, Dearborn, MI (US)

(72) Inventors: Robert Steven Sawyer, Farmington Hills, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 802 days.

(21) Appl. No.: 14/600,629

(22) Filed: Jan. 20, 2015

(65) Prior Publication Data
US 2016/0207376 A1    Jul. 21, 2016

(51) Int. Cl.
*B60H 1/32* (2006.01)
*F25B 25/00* (2006.01)

(52) U.S. Cl.
CPC .......... *B60H 1/323* (2013.01); *B60H 1/3227* (2013.01); *F25B 25/005* (2013.01)

(58) Field of Classification Search
CPC ........ F25B 25/005; B60H 2001/00185; B60H 2001/002; B60H 1/247; B60H 1/323
See application file for complete search history.

(56) References Cited

U.S. PATENT DOCUMENTS

| | | | |
|---|---|---|---|
| 3,550,522 A * | 12/1970 | Bauer ............... | B60H 1/00264 454/144 |
| 3,850,006 A | 11/1974 | Redfern et al. | |
| 5,904,052 A * | 5/1999 | Inoue ................ | B60H 1/00007 165/43 |
| 6,230,508 B1 | 5/2001 | Baker et al. | |
| 6,758,054 B2 | 7/2004 | Zheng et al. | |
| 6,983,793 B2 | 1/2006 | Zheng et al. | |
| 7,591,143 B2 | 9/2009 | Zeigler et al. | |
| 8,381,540 B2 | 2/2013 | Alston | |
| 8,424,331 B2 | 4/2013 | Monforte | |
| 8,517,087 B2 | 8/2013 | Zeigler et al. | |
| 2005/0067158 A1* | 3/2005 | Ito ..................... | B60H 1/00007 165/204 |
| 2008/0156032 A1* | 7/2008 | Cur .................... | F25B 25/00 62/448 |
| 2010/0005822 A1 | 1/2010 | Bering et al. | |

FOREIGN PATENT DOCUMENTS

DE         10321295         12/2004

* cited by examiner

*Primary Examiner* — David J Teitelbaum
(74) *Attorney, Agent, or Firm* — Vichet Chea; Price Heneveld LLP

(57) ABSTRACT

A vehicle air-conditioning system includes a primary loop coupled to an air-conditioner that cools a refrigerant in the primary cooling loop for delivery to a primary heat exchanger, a secondary cooling loop in communication with the primary heat exchanger, wherein cooling from the refrigerant is transferred to a coolant in the secondary cooling loop and a secondary heat exchanger for transferring cooling from the coolant to air delivered to a rear of a vehicular passenger cabin.

9 Claims, 7 Drawing Sheets

AUXILIARY VEHICLE HVAC SYSTEM FOR EFFICIENT MULTI-ZONE SPOT COOLING

FIELD OF THE INVENTION

The present invention generally relates to vehicle heating ventilation air-conditioning systems, and more specifically, a vehicle heating ventilation air-conditioning system having auxiliary cooling capabilities for spot cooling multiple zones within the vehicle cabin.

BACKGROUND OF THE INVENTION

Typical vehicles include heating ventilation and air conditioning (HVAC) systems that provide cooling to various portions of the vehicle. Generally, the vehicle includes a single air conditioning unit that cools air obtained internally and/or externally of the vehicle that is then delivered through ducts spaced throughout the vehicle cabin for delivery to various portions of the cabin of the vehicle. The amount of air delivered to various portions of the vehicle is generally regulated by modifying the speed of the fan that blows the air through the duct system of the vehicle and also by opening and closing vent louvers spaced throughout the vehicle cabin.

SUMMARY OF THE INVENTION

According to one aspect of the present invention, a vehicle air-conditioning system includes a primary cooling loop coupled to an air conditioner that cools a refrigerant in the primary cooling loop for delivery to a primary heat exchanger. A secondary cooling loop is in communication with the primary heat exchanger. Cooling from the refrigerant is transferred to a coolant in the secondary cooling loop. A secondary heat exchanger is disposed in the secondary cooling loop for transferring cooling from the coolant to air delivered to a rear of a vehicular passenger cabin.

According to another aspect of the present invention, a vehicle air-conditioning system includes primary and secondary cooling loops in thermal communication at a primary heat exchanger. Refrigerant in the primary cooling loop is transferred to a separate coolant in the secondary cooling loop within the primary heat exchanger. A secondary heat exchanger is in communication with the secondary cooling loop and transfers cooling from the coolant to air delivered to a rear of a vehicular passenger cabin.

According to another aspect of the present invention, a vehicle air-conditioning system includes primary and secondary cooling loops in thermal communication at a primary heat exchanger. A refrigerant confined in the primary cooling loop delivers cooling from an air conditioner to the primary heat exchanger. A coolant confined in the secondary cooling loop delivers cooling from the primary heat exchanger to a secondary heat exchanger that delivers cooling from the coolant to air for conditioning the vehicle cabin.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
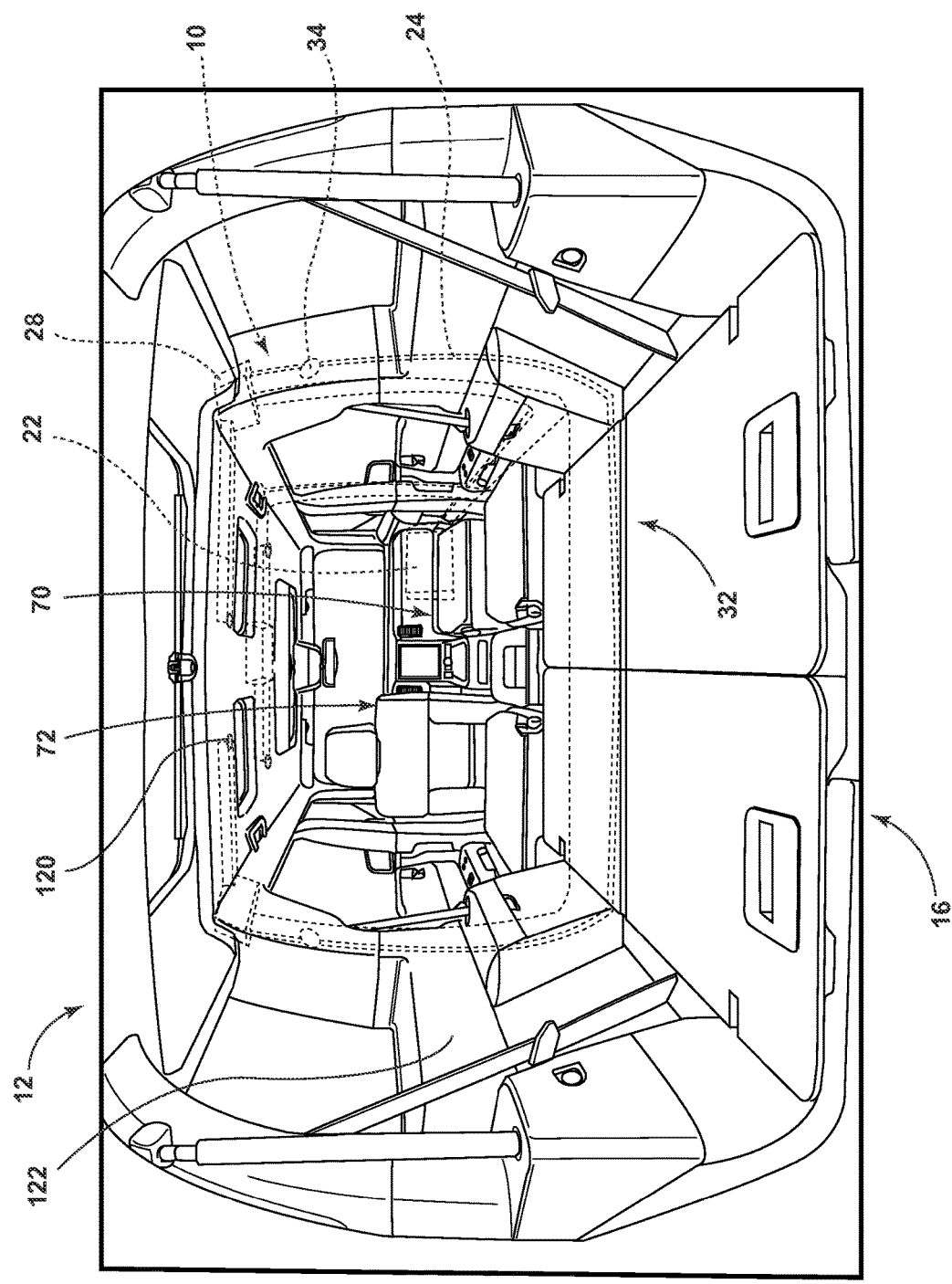
FIG. 1 is a rear perspective view of a vehicle with an embodiment of the auxiliary cooling system installed therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
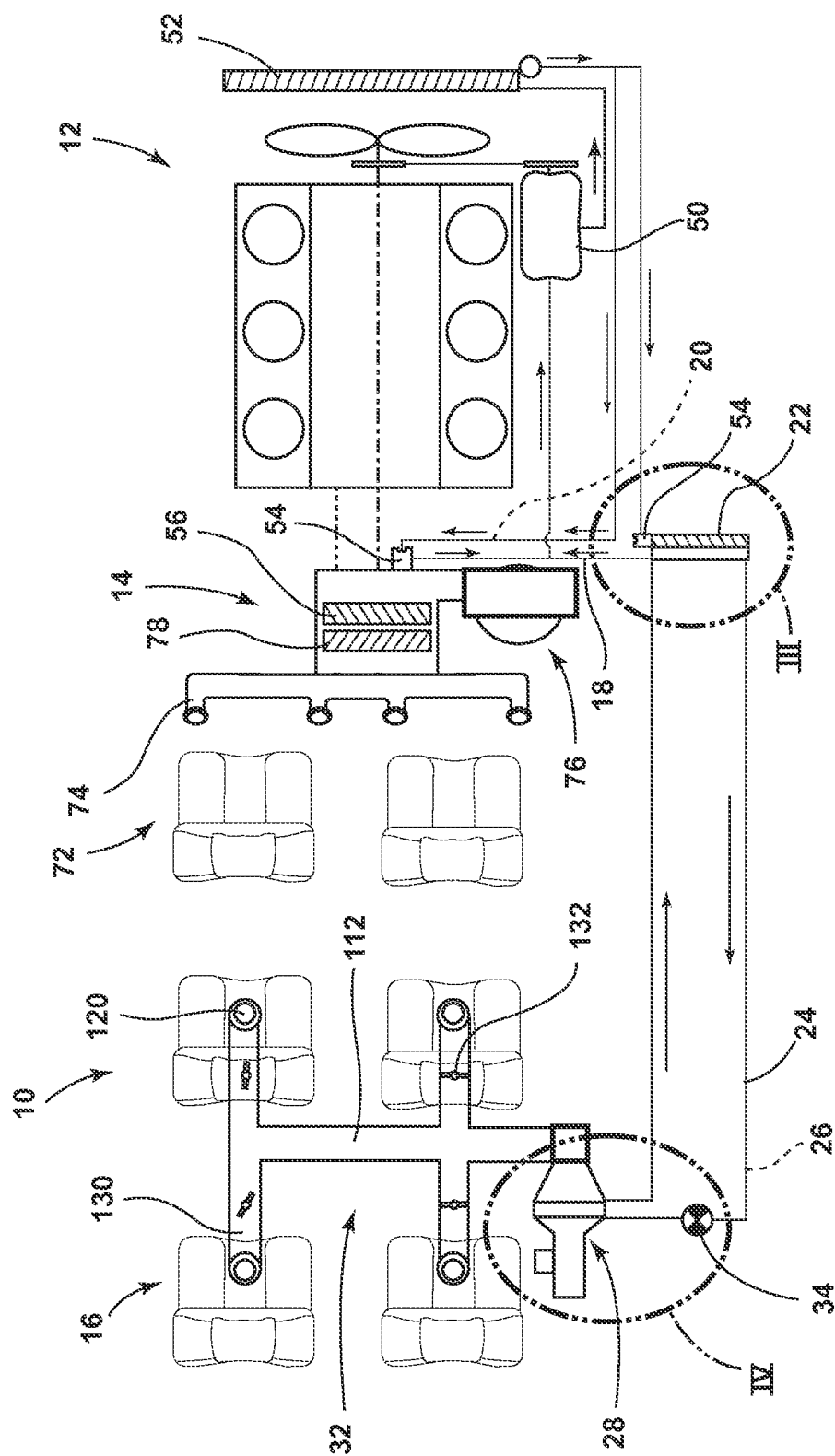
FIG. 2 is a schematic plan view of the vehicle of FIG. 1 showing an embodiment of the auxiliary cooling system placed in thermal communication with the primary air-conditioning system of the vehicle.
Figure 9:
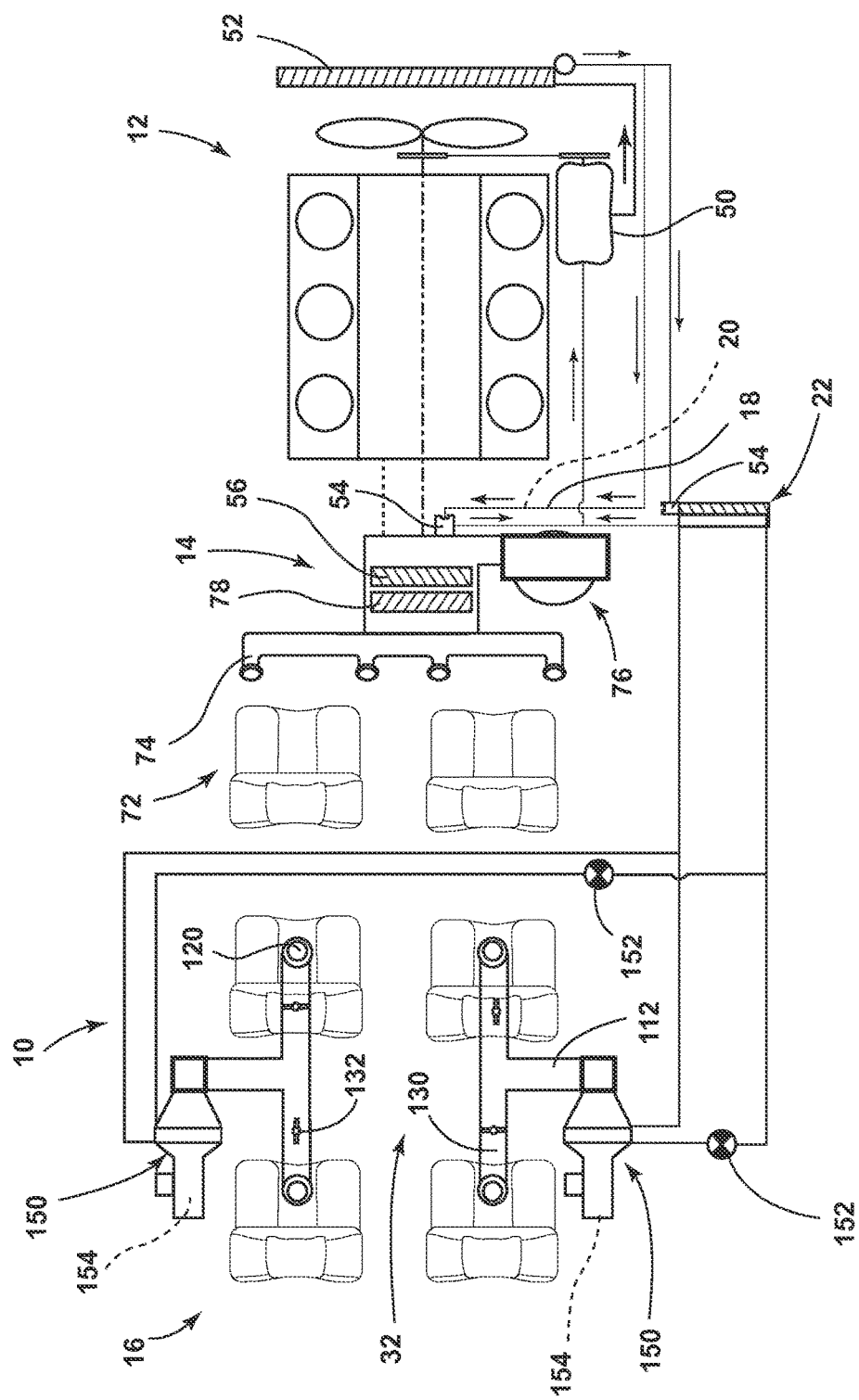
FIG. 9 is a schematic plan view of a vehicle showing an alternate embodiment of the auxiliary cooling system installed therein.
Figure 10:
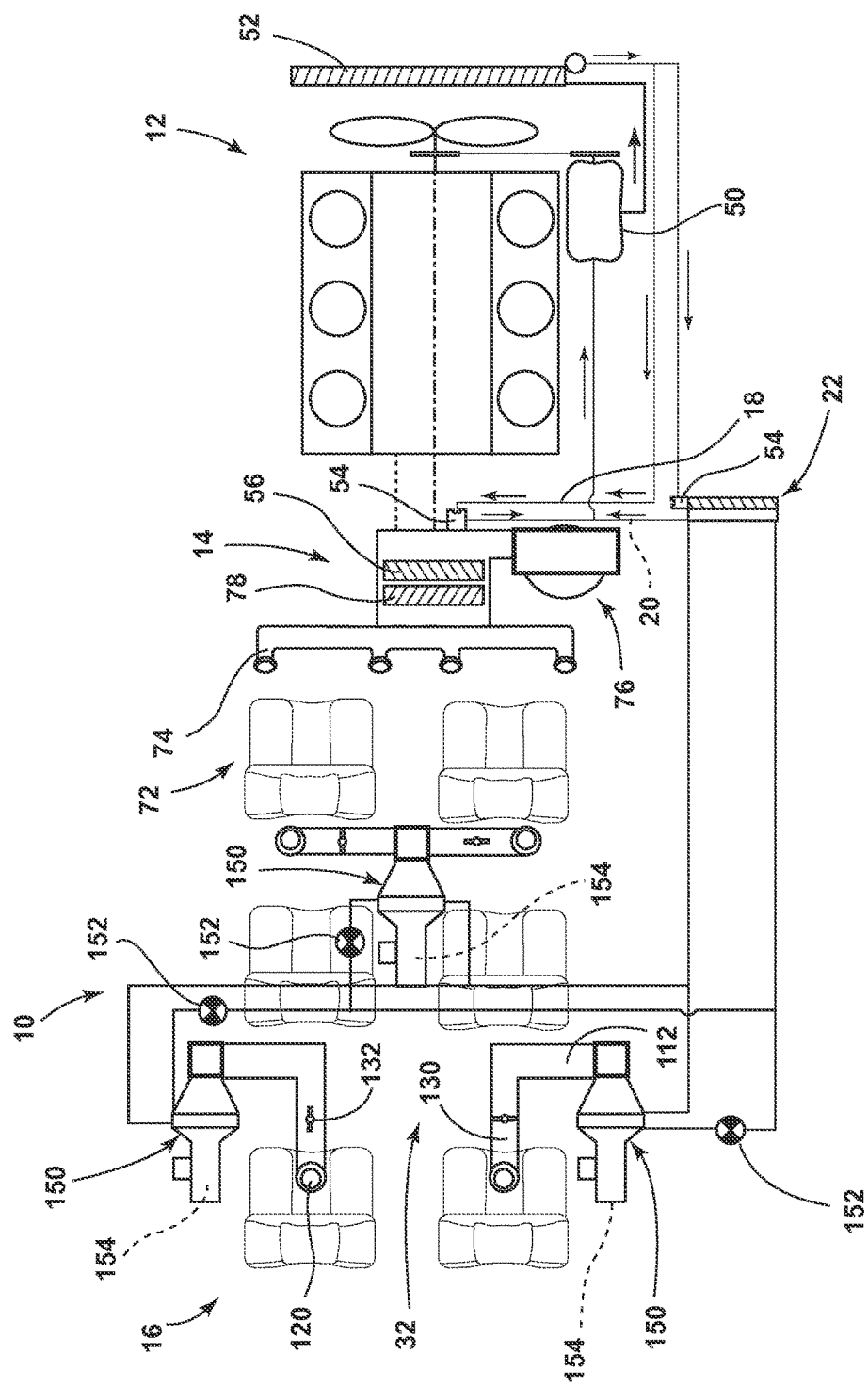
FIG. 10 is a schematic plan view of a vehicle showing another alternate embodiment of the auxiliary cooling system installed therein.

As shown in FIGS. 1-6, reference numeral 10 generally refers to an auxiliary cooling system installed within a vehicle 12 and placed in communication with an air-conditioning system 14 for a vehicle 12 that is adapted to deliver cooling to various portions of a passenger cabin 16 of a vehicle 12. The auxiliary cooling system 10 of the vehicle 12 includes a primary cooling loop 18 that is coupled to the air-conditioning system 14 that cools a refrigerant 20 in the primary cooling loop 18 for delivery to a primary heat exchanger 22. The auxiliary cooling system 10 also includes a secondary cooling loop 24 that is placed in communication with the primary heat exchanger 22. Cooling from the refrigerant 20 disposed within the primary cooling loop 18 is transferred via the primary heat exchanger 22 to a coolant 26 disposed within the secondary cooling loop 24. The multi-zone auxiliary cooling system 10 also includes a secondary heat exchanger 28 configured to transfer cooling from the coolant 26 to air 30 delivered to a rear 32 of the passenger cabin 16. According to the various embodiments, the amount of cooling delivered to the secondary heat exchanger 28 can be regulated by a coolant flow-control valve 34 disposed within the secondary cooling loop 24. It is also contemplated that the primary and secondary cooling loops 18, 24 are closed loops such that the refrigerant 20 of the primary cooling loop 18 remains separate from a coolant 26 disposed within a secondary cooling loop 24. It is contemplated that the various embodiments of the auxiliary cooling system 10 can include a single-zone auxiliary system as shown in FIG. 2, a dual-zone auxiliary system as shown in FIG. 9, a tri-zone auxiliary system as shown in FIG. 10, or an auxiliary cooling system 10 having more zones within conditioning air can be provided.

Referring now to FIGS. 1-6, the air-conditioning system 14 of the vehicle 12 that is placed in communication with the auxiliary cooling system 10 includes a compressor 50, a condenser 52, an expansion device 54, an evaporator 56 and a refrigerant 20 that is configured to flow through the air-conditioning system 14. The compressor 50 of the air-conditioning system 14 of the vehicle 12 is configured to compress the refrigerant 20 that is at least partially in a gaseous form. The pressurized refrigerant gas is delivered to the condenser 52. Exterior air 30a is drawn across the condenser 52 via a fan or other air handling unit to radiate heat out of the air-conditioning system 14. In a vehicle 12, the condenser 52 of the air-conditioning system 14 is generally a radiator disposed proximate the engine compartment of the vehicle 12. The process of pressurizing the gas through the compressor 50 and moving the pressurized gas through the condenser 52 tends to create heat. The exterior air 30a drawn through the twisting tubes of the condenser 52 tends to cool the refrigerant 20 down such that the refrigerant 20 changes to a liquid form. The result is a highly pressurized liquid refrigerant 20 that contains cooling that can be delivered to the passenger cabin 16 of the vehicle 12. The term "cooling" is used to describe a transferred thermal energy that can be delivered through the refrigerant 20 and/or the coolant 26 through the air-conditioning system 14 as well as the auxiliary cooling system 10. It is contemplated that this same concept of the transfer of thermal energy also applies to heat or heating that is delivered through these systems. It is contemplated that in certain vehicles 12, the air-conditioning system 14 can include a receiver/dryer that includes a desiccant that extracts water from the liquid refrigerant 20. The pressurized liquid refrigerant 20 is then moved to the expansion device 54, such as an expansion valve, where the highly pressurized liquid refrigerant 20 is permitted to expand to reduce the pressure on the refrigerant 20. The expansion of the pressurized liquid refrigerant 20 allows a portion of the refrigerant 20 to return to gaseous form as it enters the evaporator 56.

In certain embodiments, the air-conditioning system 14 of the vehicle 12 can include an orifice tube rather than expansion device 54. In either embodiment, the orifice tube and the expansion device 54 serve the same purpose to allow refrigerant 20 to expand and lower the pressure such that a gaseous refrigerant 20 can enter the evaporator 56. In various embodiments, the receiver dryer can be replaced with an accumulator when an orifice tube is used in the air-conditioning system 14.

Referring again to FIGS. 1-6, as the low pressure gaseous refrigerant 20 moves through the evaporator 56, the refrigerant 20, being at a relatively low temperature due to the expansion from high pressure to low pressure evaporates and absorbs heat as the refrigerant 20 moves through the evaporator 56. The absorption of heat occurs as the refrigerant 20 increases in enthalpy as a result of its evaporation as it moves through the evaporator 56. As the low pressure refrigerant 20 moves through the evaporator 56, a portion of the refrigerant 20 changes as to its state of matter, evaporates, and returns to a gaseous form. The transition of the cooled low pressure refrigerant 20 to a partially gaseous refrigerant 20 serves to absorb the heat surrounding the evaporator 56 such that the temperature of the area surrounding the evaporator 56 is lowered. This cooled air 30 surrounding the evaporator 56 is then blown via an air moving apparatus through ductwork contained within a portion of the vehicle 12 to deliver the cooled air 30 through the passenger cabin 16. The now partially gaseous refrigerant 20 leaving the evaporator 56 is then returned to the compressor 50 to begin the cycle again.

Generally, the evaporator 56 is positioned near the passenger cabin 16, such as above the foot well 70 of the passenger cabin 16, or other similar location proximate the passenger cabin 16. According to the various embodiments, as illustrated in FIGS. 2, 9 and 10, the evaporator 56 for the air-conditioning system 14 for the vehicle 12 can be used to provide cooling to front portions 72 of the passenger cabin 16, wherein substantially short lines of forward ductwork 74 receive air 30 from a primary air handler 76 that moves air 30 through the evaporator 56 for the air-conditioning system 14 and provides that cool air 30 to front portions 72 of the passenger cabin 16. Similarly, a heater 78 can be disposed within the vehicle 12 for providing air 30 that has been heated to the front portions 72 of the passenger cabin 16.

Referring again to FIGS. 1-6, the refrigerant from the condenser 52, such as the vehicle radiator, can be delivered to separate expansion devices 54, such as a thermal expansion valve, for the air-conditioning system 14 of the vehicle and for the primary heat exchanger 22. The refrigerant 20 from the condenser 52 can be portioned between the expansion devices 54 by a "T" connector 100. After the refrigerant 20 has gone through the two expansion devices 54 and provided cooling for both the air-conditioning system 14 and the primary heat exchanger 22, the refrigerant 20, now in gaseous form, can be delivered back to the compressor 50 via another "T" connector 100. In this embodiment, the primary cooling loop 18 encompasses a refrigerant 20 that is delivered from the compressor 50, to the condenser 52, to the expansion devices 54 for the air-conditioning system 14 and the primary heat exchanger 22, then back to the compressor 50.

Figure 3:
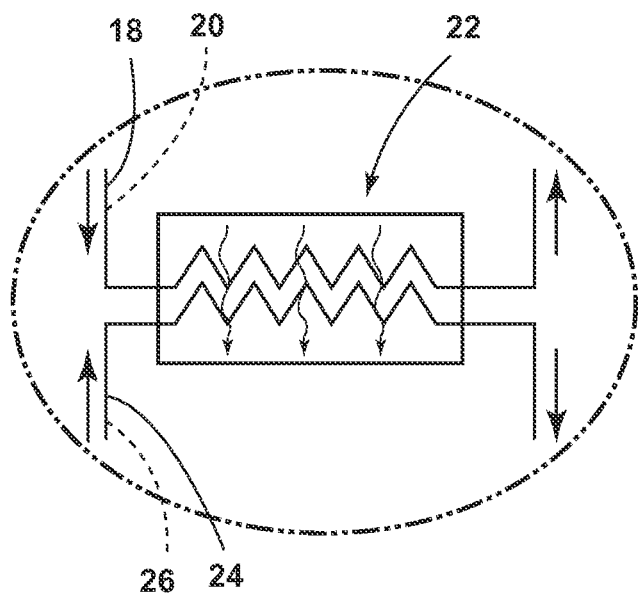
FIG. 3 is a detail schematic plan view of the primary heat exchanger for the auxiliary cooling system of FIG. 2 taken at area III.
Figure 4:
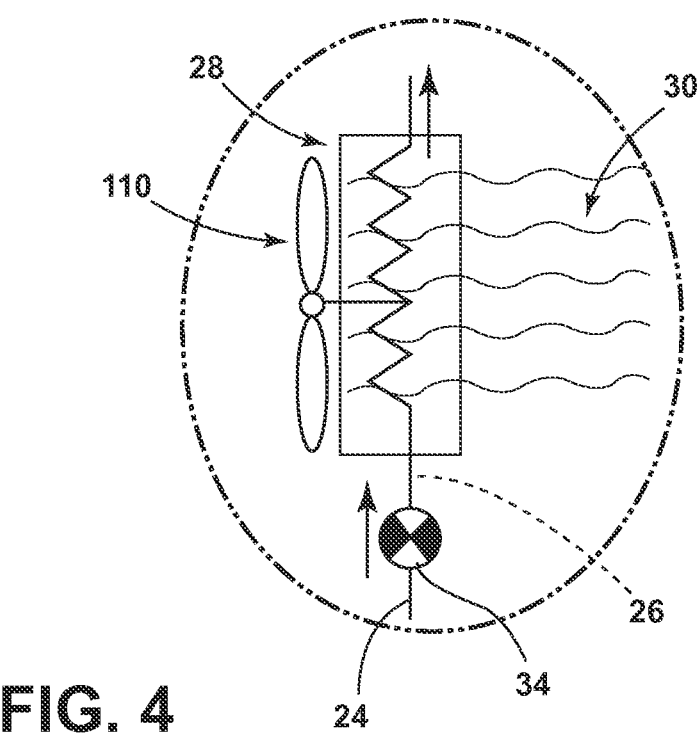
FIG. 4 is a detail schematic plan view of the secondary heat exchanger for the auxiliary cooling system of FIG. 2 taken at area IV.
Figure 5:
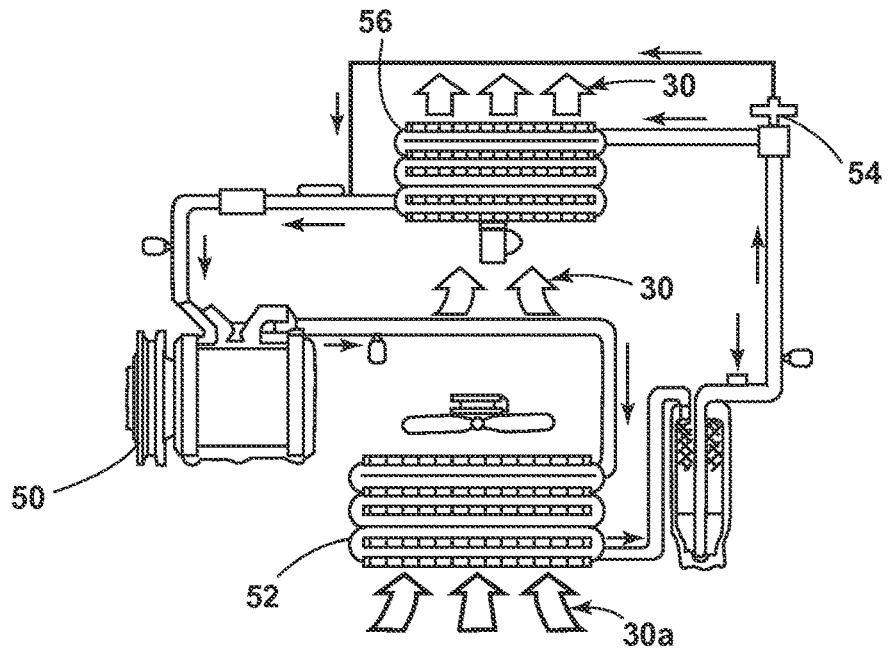
FIG. 5 is a schematic diagram of an exemplary air-conditioning system for a vehicle.
Figure 6:
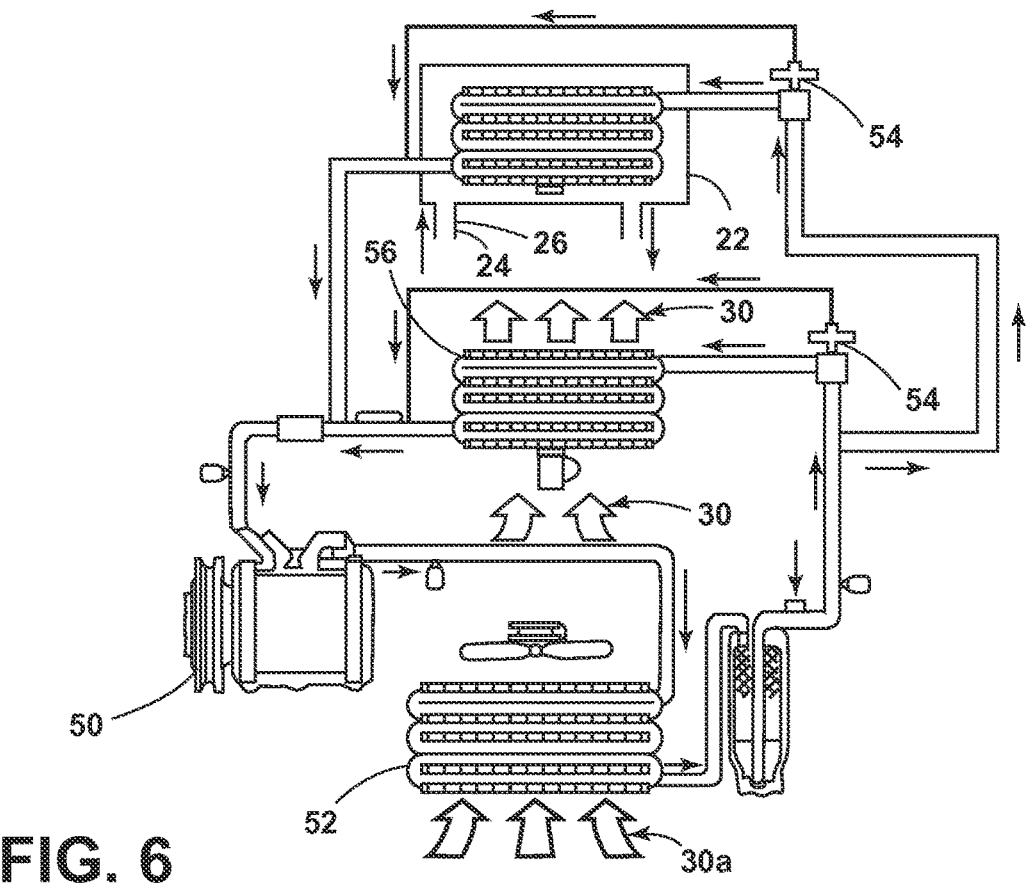
FIG. 6 is a schematic diagram of the vehicle air-conditioning system of a vehicle incorporating an embodiment of a primary cooling loop.
Figure 7:
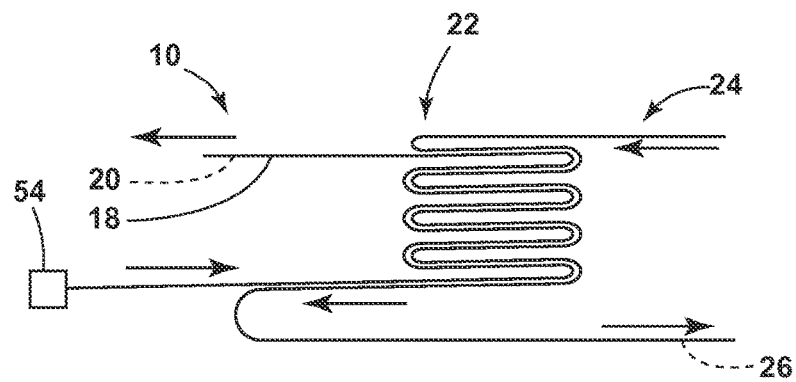
FIG. 7 is a detail schematic view of an exemplary vehicle air-conditioning system in thermal communication with the multi-zone auxiliary cooling system.

According to various embodiments, in addition to cooling the air 30 for delivery to various portions of the passenger cabin 16, the evaporator 56 of the air-conditioning system 14 of the vehicle 12 can also be used to cool other aspects of the vehicle HVAC system. Accordingly, the primary cooling loop 18 of the multi-zone auxiliary cooling system 10 can be run alongside portions of the evaporator 56 of the air-conditioning system 14 of the vehicle 12 (as shown in FIG. 7). As such, as the evaporator 56 cools the area surrounding the evaporator 56, the evaporator 56 of the air-conditioning system 14 also cools the refrigerant 20 contained within the primary cooling loop 18 of the multi-zone auxiliary cooling system 10. The cooled refrigerant 20 contained within the primary cooling loop 18 can then be delivered to the primary heat exchanger 22 positioned, typically, proximate the front portion 72 of the vehicle 12. It is also contemplated that the primary heat exchanger 22 can be located in other portions of the vehicle 12, that can include, but are not limited to, the front, rear, engine compartment, floor, undercarriage, ceiling, or other similar location proximate the passenger cabin 16 or within the vehicle 12 in general. The primary heat exchanger 22 can act like an evaporator to then transfer the cooling obtained from the evaporator 56 of the air-conditioning system 14 into the secondary cooling loop 24 through a heat-exchange relationship. In this manner, within the primary heat exchanger 22 (as shown in FIG. 3), a portion of the primary cooling loop 18 is run adjacent to a portion of the secondary cooling loop 24 such that the cooled refrigerant 20 within the primary cooling loop 18 transfers at least a portion of the cooling from the primary cooling loop 18 into the coolant 26 disposed within the secondary cooling loop 24. The coolant 26 within the secondary cooling loop 24 is then delivered to the secondary heat exchanger 28 for delivery into various portions of the passenger cabin 16, and, in particular, the rear 32 of the passenger cabin 16.

In order to cause the coolant 26 and refrigerant 20 to flow through the respective primary and secondary cooling loops 18, 24, each of the primary and secondary cooling loops 18, 24 can include a pump that causes the refrigerant 20 and coolant 26 to flow through the primary and secondary cooling loops 18, 24, respectively. In this manner, cooling can be delivered within the primary cooling loop 18 to the primary heat exchanger 22 and then within the secondary cooling loop 24 and to the secondary heat exchanger 28, for delivery into the passenger cabin 16.

Figure 8:
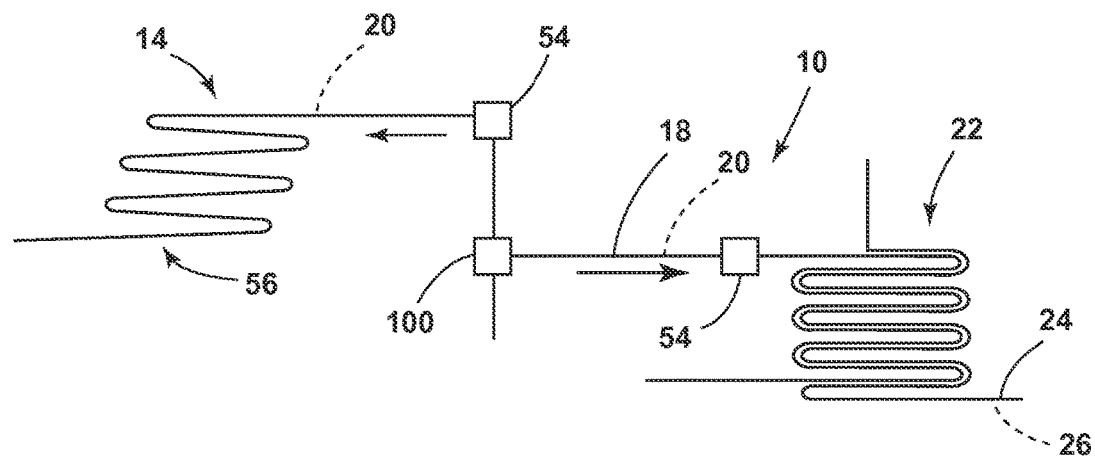
FIG. 8 is another schematic plan view of an exemplary vehicle air-conditioning system in fluid communication with the multi-zone auxiliary cooling system.

Referring now to FIG. 8, in various alternate embodiments, cooling from the air-conditioning system 14 of the vehicle 12 can be transferred to the primary cooling loop 18 via a "T" connector 100 that portions coolant 26 leaving the condenser 52 between the expansion device 54 for the air-conditioning system 14 for the vehicle 12 and a separate expansion device 54 disposed within the primary cooling loop 18 where the expansion device 54 for the primary cooling loop 18 is disposed proximate the primary heat exchanger 22. In various embodiments, the "T" connector 100 can also be positioned upstream from the expansion device 54 for the air conditioning system 14. It is also contemplated that the "T" connector 100 can be positioned downstream from the expansion device 54 of the air-conditioning system 14 for the vehicle 12. In such an embodiment, the primary cooling loop 18 would not need its own dedicated expansion device 54 disposed within. According to the various embodiments, the "T" connector 100 can be any one of various branch connectors or valves that can include, but are not limited to, a solenoid valve, a split valve, "Y" connector, or other similar connector or valve that can deliver various amounts of cooling between the air-conditioning system 14 of the vehicle 12 and the primary heat exchanger 22 of the primary cooling loop 18 of the multi-zone auxiliary cooling system 10.

Referring again to FIGS. 1-6, after the cooling has been transferred from the primary cooling loop 18 into the secondary cooling loop 24 and the cooling is then transferred to the secondary heat exchanger 28, the secondary heat exchanger 28 can include an air handler 110 and at least one duct 112. In this manner, the air handler 110, such as a fan, blower, or other air moving equipment, is configured to move air 30 across the secondary heat exchanger 28 to deliver cooling from the secondary cooling loop 24 into a column of air 30 that can be delivered to the passenger cabin 16, either directly, or through the at least one duct 112 to a portion of the rear 32 of the passenger cabin 16 of the vehicle 12. The amount of cooling delivered through the duct 112 and into the rear 32 of the passenger cabin 16 of the vehicle 12 can be controlled by the velocity of the air handler 110 that moves air 30 across the secondary heat exchanger 28. In such an embodiment, the flow of coolant 26 through the secondary cooling loop 24 can be relatively consistent and the adjustable velocity of air 30 moved across the secondary heat exchanger 28 can determine the amount of cooling that can be delivered to the rear portions of the passenger cabin 16.

Referring again to FIGS. 1-6, it is contemplated that the secondary cooling loop 24 can include the coolant flow-control valve 34 that is disposed upstream from the secondary heat exchanger 28. The coolant flow-control valve 34 can be manipulated to increase or decrease the rate of flow of the coolant moving through the secondary heat exchanger 28, such that the amount of cooling delivered to the secondary heat exchanger 28 can be controlled in a substantially precise fashion to deliver a predetermined amount of coolant 26, and, in turn, cooling, to the secondary heat exchanger 28.

According to various embodiments, it is contemplated that in addition to the coolant flow-control valve 34, the air handler 110 disposed proximate the secondary heat exchanger 28 can also include a variable speed air handler 110 that can deliver varying amounts of air 30 through the ducts 112 to be delivered into the rear portion of the passenger cabin 16 of the vehicle 12. The amount of air 30 delivered to the passenger cabin 16 can also be controlled by various vents, such as louvered vents 120 disposed within the interior wall 122 or ceiling of the passenger cabin 16, where the louvered vents 120 can control the amount of air 30 released from the vent as well as the direction of air 30 leaving the vent.

Referring again to FIG. 2, it is contemplated that each duct 112 can include a plurality of sub-ducts 130, where each of the sub-ducts 130 can include a corresponding louvered vent 120. Additionally, each of the ducts 112 and/or sub-ducts 130 can include a baffle 132 that is further configured to regulate the volume of air 30 delivered to various portions of the rear 32 of the passenger cabin 16 of the vehicle 12. In this manner, a single air handler 110 that moves air 30 across the secondary heat exchanger 28 can be placed in communication with various ducts 112 and sub-ducts 130 that have a series of operable baffles 132 disposed therein. The various baffles 132 disposed within the one or more ducts 112 and the one or more sub-ducts 130 can be manipulated to open and close the various ducts 112 and sub-ducts 130 to also regulate the amount of air 30 that travels from the secondary heat exchanger 28 to the various portions of the passenger cabin 16. In use, where the various occupants of the vehicle 12 may require air 30 to one specific portion of the rear 32 of the passenger cabin 16, baffles 132 controlling the various sub-ducts 130 for delivering air 30 to other portions of the rear 32 of the passenger cabin 16 can be substantially closed such that air 30 from the secondary heat exchanger 28 can be delivered to the specific portion of the rear 32 of the passenger cabin 16 where cooling is desired. It is also contemplated that the baffles 132 can be used to modify the amount of cooled air 30 delivered to various portions of the passenger cabin 16 by modifying the baffles 132 between various partially open positions or partially closed positions to allow greater or lesser volumes of air 30 to be delivered from the secondary heat exchanger 28, via the air handler 110, and into the various portions of the passenger cabin 16.

According to the various embodiments, various controls can be positioned throughout the passenger cabin 16 to control the operation of the various components of the multi-zone auxiliary cooling system 10. Such controls can include a master control that can be used to regulate all components of the multi-zone auxiliary cooling system 10, such a master control being positioned at the front portion 72 of the vehicle 12. Additional zone-specific controls can be located throughout the cabin to allow the occupants of the passenger cabin 16 to control the climate (temperature, humidity and other variations) of their respective portion of the passenger cabin 16. These various controls can be used to manipulate various components of the multi-zone auxiliary cooling system 10 that can include, but are not limited to, the coolant flow-control valves 34, the baffles 132, and others.

According to the various embodiments, the system of delivering a coolant 26 from the primary heat exchanger 22 disposed at the front of the vehicle 12 through the secondary cooling loop 24 into to the secondary heat exchanger 28 has been determined to be substantially more efficient than delivering cooled air 30 via a network of ductwork from the front of the vehicle 12 throughout the entire passenger cabin 16 of the vehicle 12. Where ductwork is used to deliver air 30 from the front of the passenger cabin 16 to the rear portions of the passenger cabin 16, cooling can be lost as air 30 travels through the network of ductwork. Various dynamic and static pressures exerted upon the air 30 moving through the ductwork can also slow the velocity of air 30 delivered through the ductwork. These inefficiencies can be substantially minimized through the use of the multi-zone auxiliary cooling system 10 that allows a secondary cooling loop 24 to deliver a coolant 26, rather than cooled air 30, from the front of the vehicle 12 at the primary heat exchanger 22 to the rear 32 of the vehicle 12 at the secondary heat exchanger 28.

Accordingly, as illustrated in FIGS. 1-4, ducts 112 and sub-ducts 130 only need to be run from the secondary heat exchanger 28 that is already disposed at the rear 32 of the vehicle 12 through minimal sections of the ducts 112 and sub-ducts 130 that are placed in communication with the secondary heat exchanger 28. Additionally, the amount of cooling delivered to the secondary heat exchanger 28 can be substantially controlled to a higher degree of precision through the use of the coolant flow-control valves 34 disposed within the secondary cooling loop 24. According to the various embodiments of the multi-zone auxiliary cooling system 10, cooling can be delivered through the secondary cooling loop 24 only when needed, such as when passengers are present within the rear 32 of the passenger cabin 16. Where no passengers occupy the rear 32 of the passenger cabin 16, or portions thereof, the coolant flow-control valve 34 for a respective portion of the rear 32 can substantially close such that the secondary cooling loop 24 does not deliver cooling to the respective second heat exchanger, thereby conserving cooling for portions of the vehicle cabin that may require additional cooling.

Referring now to FIGS. 9 and 10, it is contemplated that the secondary cooling loop 24 can include a secondary heat exchanger 28 having a plurality of area-specific secondary heat exchangers 150. In such an embodiment, each area-specific secondary heat exchanger 150 can include a dedicated coolant flow-control valve 152 that regulates the amount of coolant 26, and, in turn, cooling delivered through the secondary cooling loop 24 to each corresponding area-specific secondary heat exchanger 150. Accordingly, each of the dedicated coolant flow-control valves 152 of the area-specific secondary heat exchangers 150 can be separately controlled to allow greater or lesser amounts of coolant 26 to flow through the various portions of the secondary cooling loop 24 to deliver varying amounts of cooling to each of the area-specific secondary heat exchangers 150. Each of the area-specific secondary heat exchangers 150 can also include a dedicated air handler 154 as well as dedicated ducts 112 and one or more sub-ducts 130 through which the dedicated air handler 154 can deliver cooled air 30 (or warmed air 30) from the area-specific secondary heat exchanger 150 to various specific zones defined within the passenger cabin 16 of the vehicle 12.

According to the various embodiments, the various zones defined within the passenger compartment of the vehicle 12 can be split up into various sections that can include, but are not limited to, specific seating positions, specific seating rows, specific predetermined quadrants divided within the passenger cabin 16 of the vehicle 12, and other various subdivided areas of the passenger cabin 16. It is also contemplated that each of the ducts 112 and sub-ducts 130 of the various area-specific secondary heat exchangers 150 can include dedicated baffles 132 for further regulating the flow of air 30 to each of the zones of the passenger cabin 16 of a vehicle 12. It is also contemplated that according to various embodiments, the entirety of the passenger cabin 16 of the vehicle 12 can be heated and cooled through the use of the secondary heat exchangers 28 and area-specific secondary heat exchangers 150 described above.

According to the various embodiments, the refrigerant 20 used in the primary cooling loop 18 and the air-conditioning system 14 of the vehicle 12 can include various refrigerants 20 that can include, but are not limited to, R12, R134A, R1234yf, HFO-1234yf, R22, $CO_2$ and other similar refrigerants 20 that can be used in an air-conditioning system 14 for a vehicle 12. It is also contemplated that the coolant 26 used in the secondary cooling loop 24 for the multi-zone cooling system can be any one of various coolants 26 that can include, but are not limited to, ethylene glycol, ethylene glycol mixed with water, propylene glycol, methanol, glycerol, water, combinations thereof, and other similar coolants 26 that can be used in vehicle HVAC systems and HVAC systems in general.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle air-conditioning system comprising:
   a primary cooling loop coupled to an air conditioner that cools a refrigerant in the primary cooling loop for delivery to a primary heat exchanger;
   a secondary cooling loop in communication with the primary heat exchanger, wherein cooling from the refrigerant is transferred to a coolant in the secondary cooling loop; and
   a secondary heat exchanger having a variable speed fan for transferring cooling from the coolant to air delivered to a rear of a vehicular passenger cabin, wherein:
   the air conditioner, the primary heat exchanger and the secondary heat exchanger selectively deliver conditioned air to a common passenger compartment;
   an amount of cooling delivered to the secondary heat exchanger is regulated by a coolant flow-control valve disposed within the secondary cooling loop;
   the variable speed fan and the coolant flow-control valve are selectively operated by a controller that selectively adjusts the variable speed fan between a plurality of operating speeds and selectively adjusts a coolant flow rate of the coolant flow-control valve between a plurality of coolant flow rates;
   operation of the controller operates each of the variable speed fan and the coolant flow-control valve to regulate a temperature and a humidity of distinct portions of the vehicular passenger cabin; and the primary and secondary cooling loops are closed loops such that the refrigerant of the primary cooling loop remains separate from the coolant in the secondary cooling loop;

wherein the secondary heat exchanger includes an air handler and at least one duct, wherein the air handler moves air across the secondary heat exchanger to deliver cooling into a column of air that is delivered through the at least one duct to the rear of the vehicular passenger cabin; and wherein the at least one duct includes a plurality of sub-ducts, each of the plurality of sub-ducts including a corresponding vent, and wherein each of the plurality of sub-ducts includes a baffle that regulates a volume of air delivered to the rear of the vehicular passenger cabin, wherein a control of the secondary heat exchanger selectively operates each of the amount of cooling provided by the coolant flow-control valve for the secondary heat exchanger and a velocity of the air handler of the secondary heat exchanger.

2. The vehicle air-conditioning system of claim 1, wherein the primary heat exchanger is disposed near the front of a vehicle.

3. The vehicle air-conditioning system of claim 1, wherein the secondary heat exchanger includes a plurality of area-specific secondary heat exchangers, and wherein each of the plurality of area-specific secondary heat exchangers includes a dedicated variable speed fan and at least one sub-duct.

4. The vehicle air-conditioning system of claim 3, wherein each area-specific secondary heat exchanger includes a dedicated coolant flow-control valve that regulates an amount of the coolant delivered to each corresponding area-specific secondary heat exchanger, wherein the controller regulates delivery of the coolant between each dedicated coolant flow-control valve.

5. A vehicle air-conditioning system comprising:
primary and secondary cooling loops in thermal communication at a primary heat exchanger, wherein non-water refrigerant in the primary cooling loop transfers cooling to a separate non-water refrigerant in the secondary cooling loop; and a secondary heat exchanger in communication with the secondary cooling loop that transfers cooling from the separate non-water refrigerant to air delivered to a rear of a vehicular passenger cabin, wherein the cooling is delivered to the rear of a vehicle by a coolant flow control valve that regulates a flow of the separate refrigerant and an air handler that regulates a rate refrigerant, wherein an amount of cooling delivered to the secondary heat exchanger is regulated by a flow control valve disposed within the secondary cooling loop, wherein the secondary heat exchanger includes an air handler and at least one duct, wherein the air handler moves air across the secondary heat exchanger to deliver cooling into a column of air that is delivered through the at least one duct to the rear of the vehicular passenger cabin, wherein each at least one duct includes a plurality of sub-ducts, each of the plurality of sub-ducts including a corresponding vent, wherein each of the plurality of sub-ducts includes a baffle that regulates a volume of air delivered to the rear of the vehicular passenger cabin.

6. The vehicle air-conditioning system of claim 5, wherein the primary cooling loop is in thermal communication with an air-conditioning system of a vehicle.

7. The vehicle air-conditioning system of claim 5, wherein the secondary heat exchanger includes a plurality of area-specific secondary heat exchangers, and wherein each of the plurality of area-specific secondary heat exchangers includes a dedicated variable speed fan and at least one sub-duct.

8. The vehicle air-conditioning system of claim 7, wherein each area-specific secondary heat exchanger includes a dedicated coolant flow-control valve that regulates an amount of cooling delivered to each corresponding area-specific secondary heat exchanger, wherein the controller apportions the separate refrigerant through operation of each dedicated coolant flow-control valve.

9. The vehicle air-conditioning system of claim 7, wherein the primary and secondary cooling loops are closed loops such that the non-water refrigerant of the primary cooling loop remains separate from the separate non-water refrigerant in the secondary cooling loop.

* * * * *